United States Patent
Wu et al.

(10) Patent No.: US 11,016,554 B2
(45) Date of Patent: May 25, 2021

(54) SEMICONDUCTOR APPARATUS

(71) Applicant: DigWise Technology Corporation, LTD, Hsinchu County (TW)

(72) Inventors: JingJie Wu, Beijing (CN); Shih-Hao Chen, Hsinchu County (TW); Wen-Pin Hsieh, Hsinchu County (TW); Chih-Wen Yang, Hsinchu County (TW)

(73) Assignee: DigWise Technology Corporation, LTD, Hsinchu County (TW)

( * ) Notice: Subject to any disclaimer, the term of this patent is extended or adjusted under 35 U.S.C. 154(b) by 176 days.

(21) Appl. No.: 16/387,509

(22) Filed: Apr. 17, 2019

(65) Prior Publication Data

US 2020/0218332 A1    Jul. 9, 2020

(30) Foreign Application Priority Data

Jan. 8, 2019  (TW) ................... 108100772

(51) Int. Cl.
*G06F 1/00*  (2006.01)
*G06F 1/3287*  (2019.01)
*G06F 1/28*  (2006.01)

(52) U.S. Cl.
CPC .............. *G06F 1/3287* (2013.01); *G06F 1/28* (2013.01)

(58) Field of Classification Search
CPC .......... H03F 1/0211; H03F 2203/7239; H05B 45/48; G06F 13/4247
See application file for complete search history.

(56) References Cited

U.S. PATENT DOCUMENTS

| | | | |
|---|---|---|---|
| 5,661,434 A | 8/1997 | Brozovich et al. | |
| 6,222,284 B1 | 4/2001 | Hammond et al. | |
| 2011/0199003 A1 | 8/2011 | Muguruma et al. | |
| 2011/0309757 A1 | 12/2011 | Weaver et al. | |
| 2012/0018724 A1* | 1/2012 | Sugawara | H01L 23/481 257/48 |
| 2013/0073907 A1* | 3/2013 | Han | G01R 31/31858 714/32 |
| 2013/0207548 A1 | 8/2013 | Leshniak | |
| 2018/0328986 A1* | 11/2018 | Al-Dabagh | G01R 31/31705 |

FOREIGN PATENT DOCUMENTS

| | | |
|---|---|---|
| CN | 101102085 | 1/2008 |
| CN | 205121469 | 3/2016 |
| CN | 106774767 | 5/2017 |
| CN | 207603445 | 7/2018 |
| TW | 201627897 | 8/2016 |
| TW | 201706776 | 2/2017 |

OTHER PUBLICATIONS

"Office Action of Taiwan Counterpart Application", dated Jun. 9, 2020, p. 1-p. 4.

* cited by examiner

*Primary Examiner* — Xuxing Chen
(74) *Attorney, Agent, or Firm* — JCIPRNET (57) ABSTRACT

A semiconductor apparatus includes a plurality of chips and a first bypass switch. The chips are coupled in series between a power end and a reference ground end. The first bypass switch is coupled in series between a first end and a second end of a first chip among the chips, wherein the first end is coupled to the power end and the second end is coupled to the reference ground end. The first bypass switch is turned on according to a first control signal when an operational efficiency of the first chip is less than a threshold value and the first chip is determined to be damaged.

13 Claims, 6 Drawing Sheets

SEMICONDUCTOR APPARATUS

CROSS-REFERENCE TO RELATED APPLICATION

This application claims the priority benefit of Taiwan application serial no. 108100772, filed on Jan. 8, 2019. The entirety of the above-mentioned patent application is hereby incorporated by reference herein and made a part of this specification.

BACKGROUND

Technical Field

The disclosure relates to a semiconductor apparatus, and more particularly to a semiconductor apparatus which may improve the efficiency of power use.

Description of Related Art

In the prior art, a semiconductor apparatus may include a plurality of chips coupled in series and the chips coupled in series between a power end and a ground end to receive a power supply voltage to execute a computing operation. In practical use, one or more chips among the chips coupled in series may be damaged due to various reasons, thereby causing a reduction in operational efficiency. In the structure of the prior art, when one of the chips is damaged, the power supply voltage is still continuously supplied to the damaged chip. Since the damaged chip cannot provide the expected operational efficiency, the supplied power cannot obtain the expected efficacy and a power is wasted.

SUMMARY

The disclosure provides a semiconductor apparatus, which may effectively improve the efficiency of power use.

The semiconductor apparatus of the disclosure includes a plurality of chips and a first bypass switch. The plurality of chips is coupled in series with one another between a power end and a reference ground end. The first bypass switch is coupled in series between a first end and a second end of a first chip among the chips, wherein the first end of the first chip is coupled to the power end and the second end of the first chip is coupled to the reference ground end. The first bypass switch is turned on according to a first control signal when the first chip is determined to be damaged.

In an embodiment of the disclosure, the first bypass switch is embedded in the first chip.

In an embodiment of the disclosure, the first bypass switch is externally connected to the outside of the first chip.

In an embodiment of the disclosure, when the first bypass switch is turned on, the corresponding first chip stops operating.

In an embodiment of the disclosure, the semiconductor apparatus further includes a controller. The controller is coupled to the first chip and the first bypass switch to judge whether the operational efficiency of the first chip is less than a threshold value, so as to determine whether the first chip is damaged and to generate the first control signal.

In an embodiment of the disclosure, the controller sends a plurality of test commands to the first chip and receives a plurality of feedback information generated by the first chip. The controller determines whether the first chip is damaged according to whether the correct rate of the feedback information is more than a threshold value.

In an embodiment of the disclosure, the semiconductor apparatus further includes at least one second bypass switch. The second bypass switch is coupled between a first end and a second end of the at least one second chip among the chips, wherein the first end of the second chip is coupled to the power end and the second end of the second chip is coupled to the reference ground end. The second bypass switch is turned on according to a second control signal when the second chip is determined to be damaged.

In an embodiment of the disclosure, the at least one second bypass switch is embedded in at least one second chip or is externally suspended from the outside of the at least one second chip.

In an embodiment of the disclosure, the first chip includes N core circuits and N power switches. The N power switches are respectively coupled between a power end of the core circuit and the first end of the first chip. The power switches are respectively controlled to be turned on or off by a plurality of third control signals. N is a positive integer.

In an embodiment of the disclosure, when each of the core circuits is damaged, each of the corresponding power switches is turned off.

In an embodiment of the disclosure, each of the power switches is a transistor switch.

In an embodiment of the disclosure, the first chip further includes N clock switches. The clock switches are respectively coupled between an end point of the core circuit respectively receiving a plurality of clock signals. The clock switches are respectively controlled to be turned on or off by the third signals.

In an embodiment of the disclosure, the first chip includes N core circuits and M power switches. The power switches are respectively coupled between a power end of some of the core circuits and the first end of the first chip. The power switches are respectively controlled to be turned on or off by the plurality of third signals. N and M are positive integers, and N is more than M.

Based on the above, the disclosure provides bypass switches to be disposed between first ends and second ends of chips. The first ends and the second ends of the chips are respectively used for coupling to the power end and the reference ground end. Also, when the chip is determined to be damaged due to poor operational efficiency, the damaged chip is allowed to not receive the power supply voltage and to stop operating by turning on the bypass switch. In this way, the damaged chip will not consume the power of the power supply voltage, thereby effectively improving the efficiency of power use. Moreover, by stopping the operation of the damaged chip, the operational accuracy of the semiconductor apparatus may be improved, thereby improving the overall efficacy.

To make the aforementioned and other features of the disclosure more comprehensible, several embodiments accompanied with drawings are described in detail as follows.

DETAILED DESCRIPTION OF DISCLOSED EMBODIMENTS

Figure 1:
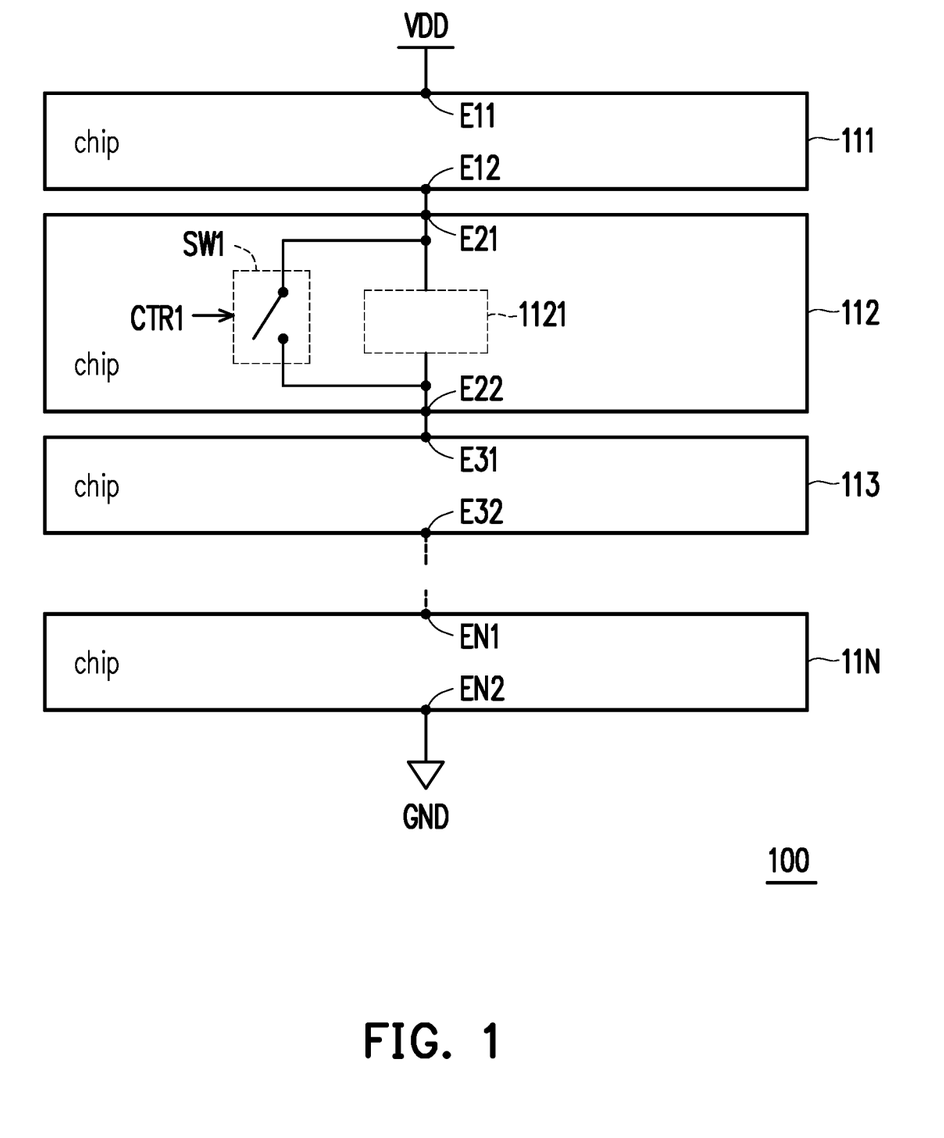
FIG. 1 is a schematic view of a semiconductor apparatus according to an embodiment of the disclosure.

Please refer to FIG. 1. FIG. 1 is a schematic view of a semiconductor apparatus according to an embodiment of the disclosure. A semiconductor apparatus 100 includes a plurality of chips 111-11N and a bypass switch SW1. The chips 111-11N are coupled in series with one another (coupled in cascade) between a power end VDD and a reference ground end GND. Each of the chips 111-11N has a first end E11, E21-EN1 coupled to the power end VDD and a second end E12, E22-EN2 coupled to the reference ground end GND. In the embodiment, the bypass switch SW1 is coupled between the first end E21 and the second end E22 of the chip 112. The bypass switch SW1 receives a control signal CTR1 and is controlled to be turned on or off by the control signal CTR1. In the embodiment, the bypass switch SW1 is embedded inside the chip 112 and is connected across two ends of a core circuit 1121 in the chip 112.

Under normal conditions, the bypass switch SW1 is turned off, the power supply voltage on the power end VDD can be sent to the inside of the chip 111 through the first end E11 of the chip 111. Then, the power supply voltage is sent to the first end E21 of the chip 112 through the second end E12 of the chip and is sent to the core circuit 1121 inside the chip 112 through the first end E21 of the chip 112. So on and so forth, all of the chips 111-11N can receive the power supply voltage for operation.

In the embodiment, when the chip 112 is determined to be damaged, the bypass switch SW1 can be turned on according to the control signal CTR1. Under such condition, the first end E21 and the second end E22 of the chip 112 are short-circuited, and the power supply voltage bypasses the chip 112 through the bypass switch SW1 which has been turned on to be supplied to the chip 113. As such, the power supply voltage can be prevented from being supplied to the core circuit 1121 in chip 112 and causing wastage of power.

Under the above condition, since the power supply voltage is not supplied to the chip 112, the chip 112, which is determined to be damaged, stops working.

The method of determining whether the chip 112 is damaged can be accomplished by testing the core circuit 1121 of the chip 112 through an external electronic apparatus (not illustrated in FIG. 1). The external electronic apparatus (for example, a controller) can provide a plurality of test commands to the core circuit 1121 of the chip 112 and receive a plurality of feedback information generated by the core circuit 1121 of the chip 112 according to the test commands. The controller determines whether the chip 112 is damaged according to whether the correct rate of the feedback information is more than a preset threshold value. The test commands may be a plurality of computing requirements. The chip 112 can generate a plurality of feedback information according to the plurality of computing requirements received. The controller calculates the number of correct feedback information (A) and divides the number of correct feedback information (A) by the total number of feedback information (B), so as to obtain the correct rate A/B. Then, by comparing the correct rate A/B and the preset threshold value, when the correct rate is more than the threshold value, the control signal CTR1 is sent to maintain the bypass switch SW1 as being turned off. In contrast, when the correct rate is not more than the threshold value, the controller sends the control signal CTR1 to change the bypass switch SW1 to be turned on.

It can be known from the above illustration that when the operational efficiency of the chip 112 is low, the semiconductor apparatus 100 according to the embodiment of the disclosure allows the power supply voltage to be not supplied to the chip 112 by determining that the chip 112 is damaged and by turning on the bypass switch SW1 corresponding to the chip 112, so as to improve the efficiency of power use. In addition, when the chip 112 is not operating, the semiconductor apparatus 100 can provide computing results with higher accuracy, thereby improving the operational efficiency thereof.

It shall be noted that in the embodiment, disposing the bypass switch SW1 between the first end E21 and the second end E22 of the chip 112 is only for illustrative purpose. In the embodiment of the disclosure, the bypass switch SW1 may be disposed between the first end and the second end of any one of the plurality of chips 111-11N coupled in series. Moreover, in other embodiments of the disclosure, one or more bypass switches may be disposed in the semiconductor apparatus 100. By turning on or off the plurality of bypass switches, the receiving status of the power supply voltage for the plurality of chips 111-11N may be regulated, thereby further improving the efficiency of power use.

Figure 2:
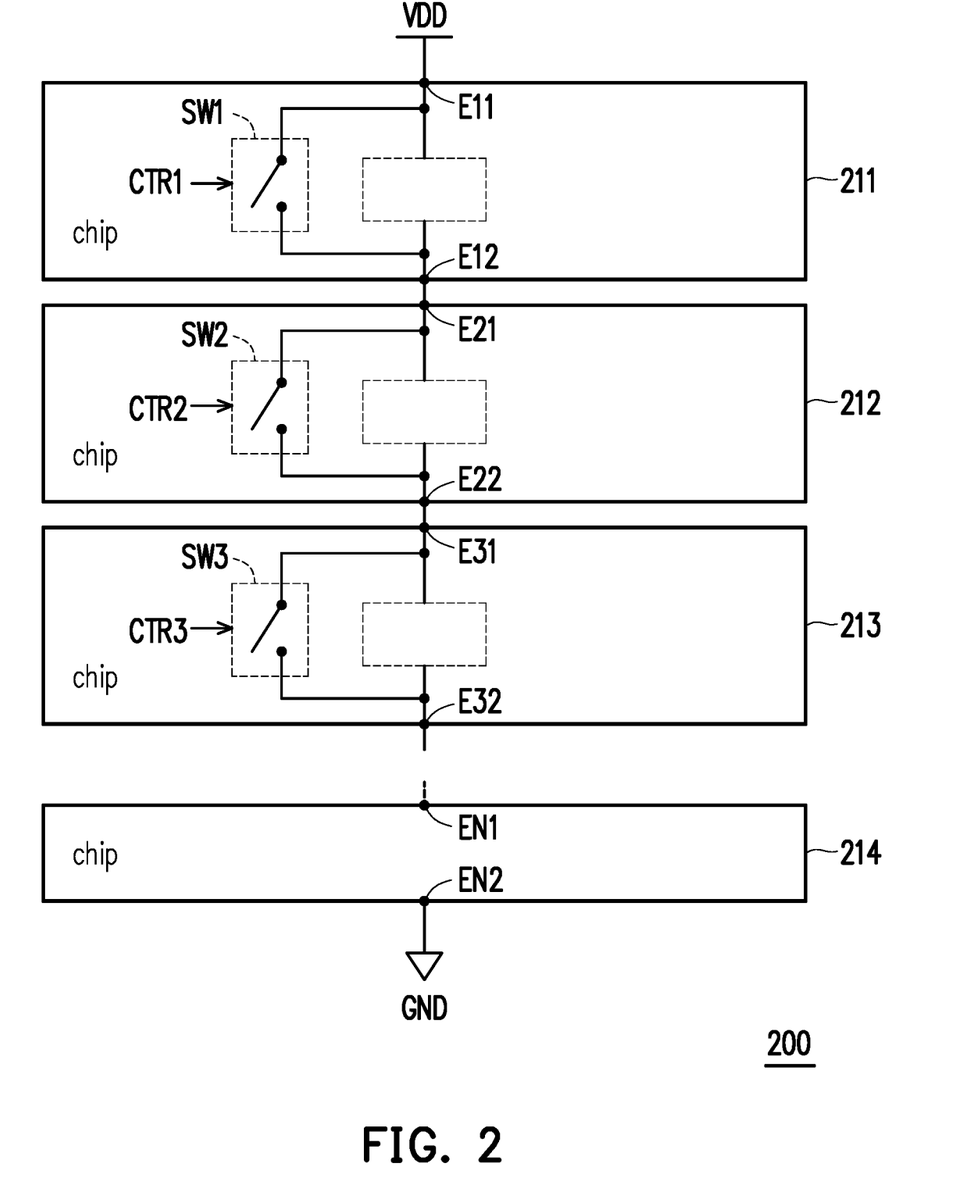
FIG. 2 and FIG. 3 are schematic views respectively illustrating a semiconductor apparatus according to different embodiments of the disclosure.
Figure 3:
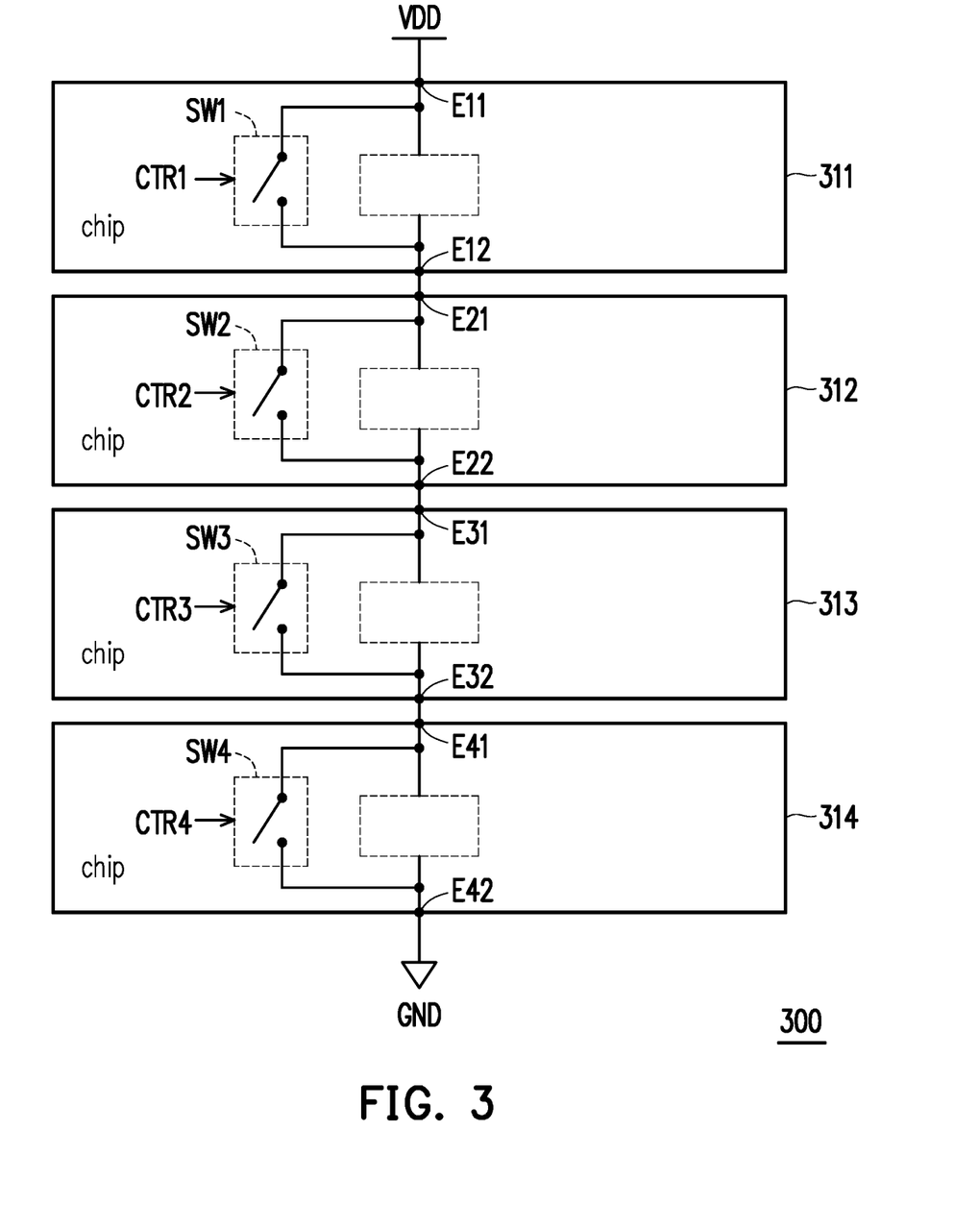

Please refer to FIG. 2 and FIG. 3. FIG. 2 and FIG. 3 are schematic views respectively illustrating a semiconductor apparatus according to different embodiments of the disclosure. In FIG. 2, a semiconductor apparatus 200 includes a plurality of chips 211-21N coupled in series with one another and bypass switches SW1-SW3. The bypass switch SW1 is coupled between a first end E11 and a second end E12 of a chip 211. The bypass switch SW2 is coupled between a first end E21 and a second end E22 of a chip 212. The bypass switch SW3 is coupled between a first end E31 and a second end E32 of a chip 213. The bypass switches SW1-SW3 are respectively controlled by the control signals CTR1-CTR3 and are respectively turned on or off according to the control signals CTR1-CTR3. The bypass switches SW1-SW3 are respectively embedded inside the chips 211-213.

For example, under normal conditions, when all of the chips 211-21N maintain sufficiently high operational efficiency, all of the bypass switches SW1-SW3 are turned off. When the operational efficiency of the chip 211 decreases and the chip 211 is determined to be damaged, the bypass switch SW1 can be turned on according to the control signal CTR1, allowing the power supply voltage to bypass the chip 211 through the bypass switch SW1 and to be not supplied to the chip 211.

It can be known from the above illustration that when the chip 212 is determined to be damaged, the corresponding bypass switch SW2 can be turned on, while when the chip 213 is determined to be damaged, the corresponding bypass switch SW3 can be turned on. In the embodiment, the on or off states of the bypass switches SW1-SW3 are mutually independent, wherein the bypass switches SW1-SW3 may be all turned off, partially turned on, or all turned on. Moreover, the control signals CTR1-CTR3 may be all the same or partially the same.

It shall be noted that only some of the chips (for example, the chips 211-213) in the embodiment are disposed with the corresponding bypass switches (for example, the bypass switches SW1-SW3). It is not required for all of the chips to be disposed with a corresponding bypass switch.

In FIG. 3, a semiconductor apparatus 300 includes chips 311-314 and bypass switches SW1-SW4. The chips 311-314 respectively corresponds to the bypass switches SW1-SW4. The bypass switch SW1 is coupled between a first end E11 and a second end E12 of the chip 311. The bypass switch SW2 is coupled between a first end E21 and a second end E22 of the chip 312. The bypass switch SW3 is coupled between a first end E31 and a second end E32 of the chip 313. The bypass switch SW4 is coupled between a first end E41 and a second end E42 of the chip 314. The bypass switches SW1-SW4 are respectively embedded inside the chips 311-314.

The bypass switches SW1-SW4 are respectively controlled by control signals CTR1-CTR4. The control signals CTR1-CTR4 are respectively generated according to whether the chips 311-314 are damaged. The control signals CTR1 to CTR4 respectively allows the corresponding bypass switches SW1-SW4 to be respectively turned on when the corresponding chips 311-314 are determined to be damaged.

In the embodiment, all of the chips 311-314 are respectively disposed with the corresponding bypass switches SW1-SW4.

Figure 4:
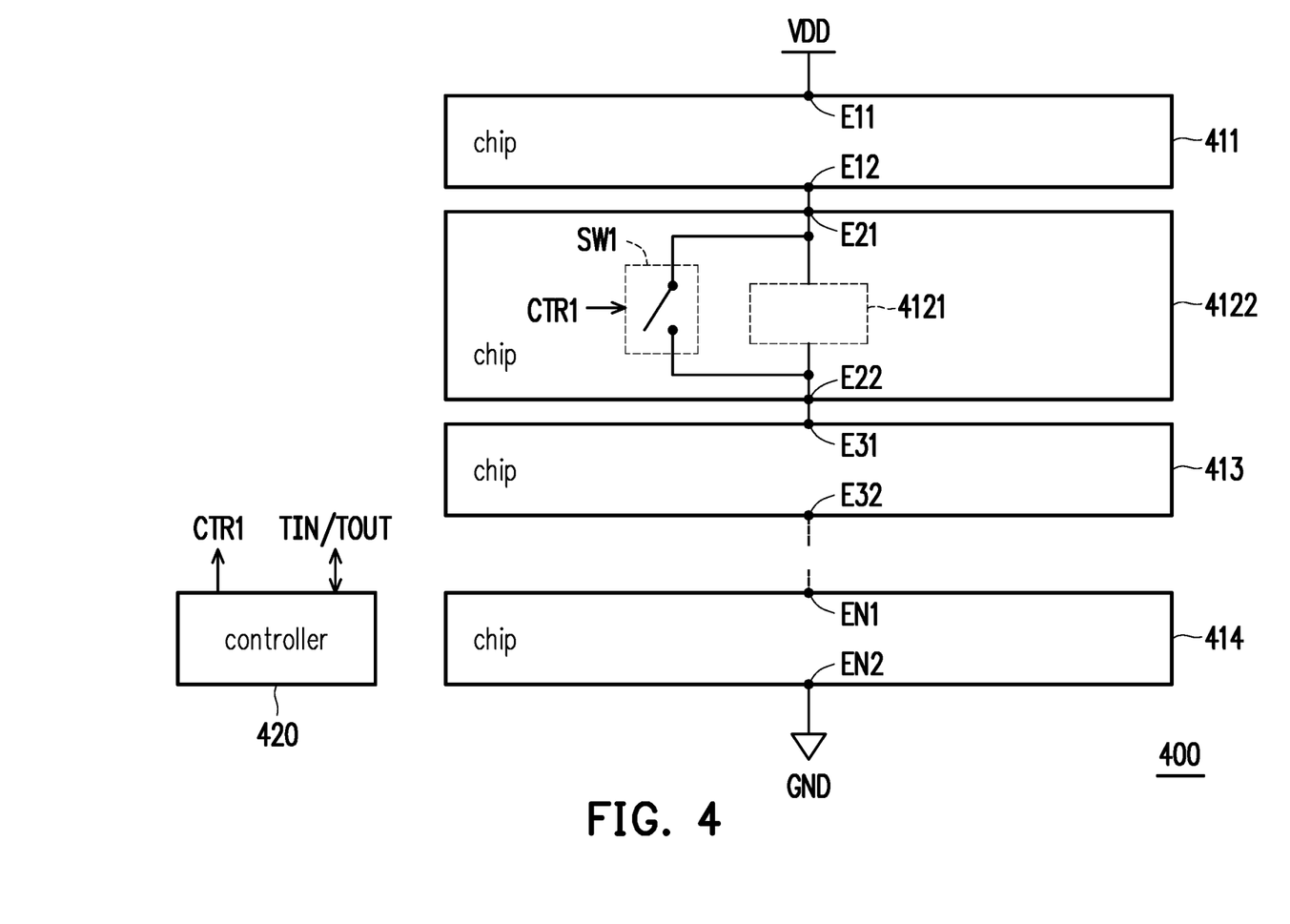
FIG. 4 is a schematic view of a semiconductor apparatus according to another embodiment of the disclosure.

Please refer to FIG. 4. FIG. 4 is a schematic view of a semiconductor apparatus according to another embodiment of the disclosure. A semiconductor apparatus 400 includes chips 411-414, a bypass switch SW1, and a controller 420. In the embodiment, the controller 420 is used for monitoring the operational efficiency of the chip 412 by sending a plurality of test commands TIN to the chip 412 and receiving a plurality of feedback information TOUT generated by the chip 412. The controller 420 determines whether the chip 412 is damaged according to whether the correct rate of the feedback information TOUT is more than a threshold value and generates a control signal CTR1 according to whether the chip 412 is damaged.

Under the condition that the chip 412 is damaged, the controller 420 can generate the control signal CTR1 to allow the bypass switch SW1 to be turned on. In contrast, under the condition that the chip 412 is not damaged, the controller 420 can generate the control signal CTR1 to allow the bypass switch SW1 to be turned off.

In other embodiments of the disclosure, the controller 420 can monitor a plurality of chips. Taking the embodiment of FIG. 2 as an example, the controller 420 can monitor the operational efficiency of the chips 211-213 by setting the on and off states of the bypass switches SW1-SW3. Taking the embodiment of FIG. 3 as an example, the controller 420 can monitor the operational efficiency of all of the chips 311-314 by setting the on and off states of the bypass switches SW1-SW4.

In the embodiment, the controller 420 may be any form of processor with computing capability. Alternatively, the controller 420 may be designed through a hardware description language (HDL) or any other design method of digital circuit known by persons with ordinary skill in the art. Also, the hardware circuit may be actualized through a Field Programmable Gate Array (FPGA), a Complex Programmable Logic Device (CPLD), or an Application-specific Integrated Circuit (ASIC), but is not limited thereto.

It shall be mentioned that in other embodiments of the disclosure, the controller 420 may be disposed in one of the chips 411-414.

Figure 5:
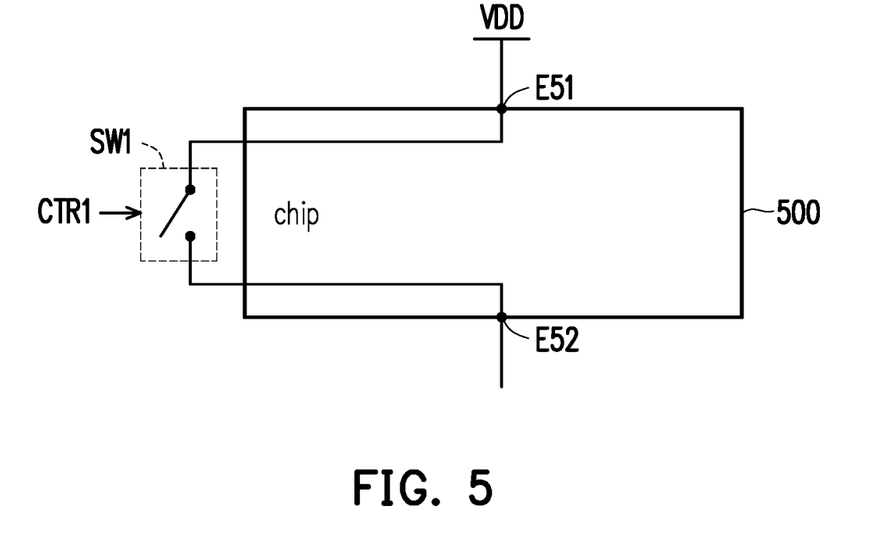
FIG. 5 is a schematic view of a bypass switch of an integrated circuit according to an embodiment of the disclosure.

Please refer to FIG. 5. FIG. 5 is a schematic view of a bypass switch of an integrated circuit according to an embodiment of the disclosure. In FIG. 5, a bypass switch SW1 may be externally suspended from the outside of a chip 500 and coupled between a first end E51 of the chip 500 for coupling to the power end and a second end E52 for coupling to the reference ground end. The bypass switch SW1 is controlled by a control signal CTR1. When the chip 500 is determined to be damaged, the bypass switch SW1 is turned on according to the control signal CTR1, allowing the first end E51 and the second end E52 to be short-circuited, and the power supply voltage to not be supplied to the circuit element in the chip 500, thereby improving the efficiency of power use.

Figure 6:
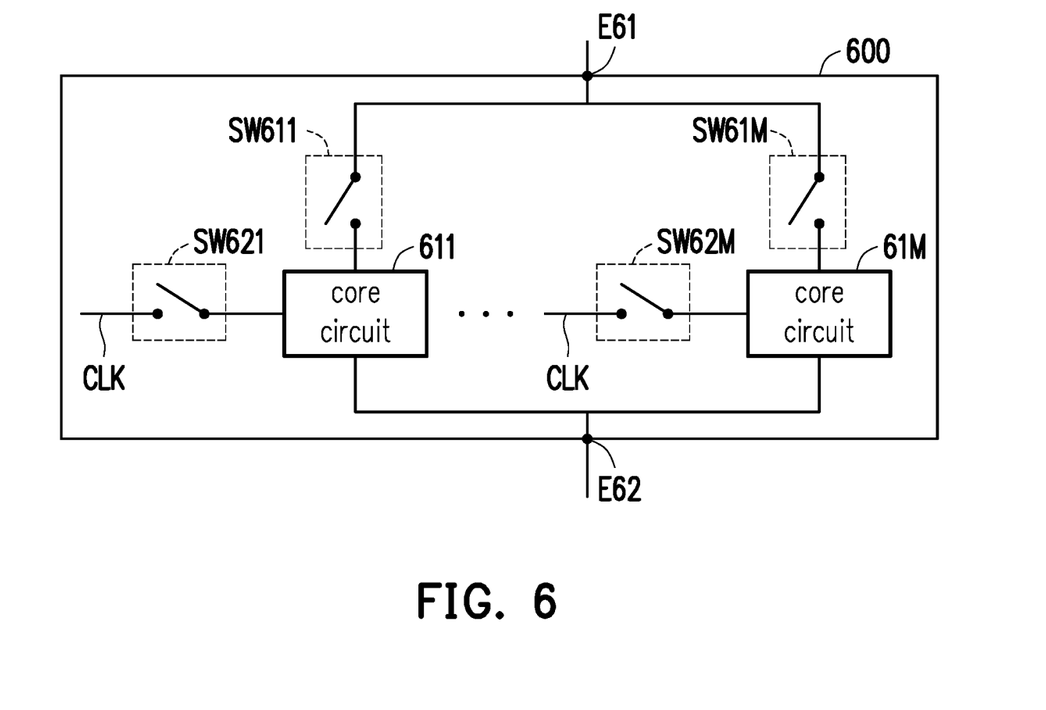
FIG. 6 is a schematic view of a chip in an integrated circuit apparatus according to an embodiment of the disclosure.

Please refer to FIG. 6. FIG. 6 is a schematic view of a chip in an integrated circuit apparatus according to an embodiment of the disclosure. In FIG. 6, a chip 600 includes a plurality of core circuits 611-61M, a plurality of power switches SW611-SW61M, and a plurality of gating elements SW621-SW62M. The power switches SW611-SW61M are respectively coupled between the core circuits 611-61M and a first end E61. When the chip 600 is determined to be damaged, the power switches SW611-SW61M are turned off according to the control signal received and the coupling path between the core circuits 611-61M and the power end is cut off to avoid a possibility of current leakage of the circuit elements in the core circuits 611-61M. The gating elements SW621-SW62M are respectively coupled between the end points of the core circuit 611-61M respectively receiving a plurality of clock signals CLK. The gating elements SW621-SW62M determine whether to mask (without sending) or to send the clock signals CLK to the corresponding core circuits 611-61M according to the plurality of control signals respectively received. It is worth noting that when the power switches SW611-SW61M corresponding to the core circuits 611-61M are cut off, the corresponding gating components SW621-SW62M are synchronously masked and the clock signals CLK are prohibited from being sent to the corresponding core circuits 611-61M.

In the embodiment of the disclosure, the gating elements SW621-SW62M may be any form of switching elements or logic gates. For example, the gating elements SW621-SW62M may respectively be a plurality of logic gates. When the respectively received control signal is logic 0, masking operation of the clock signal CLK is executed. When the respectively received control signal is logic 1, sending operation of the clock signal CLK is executed. Of course, the gating elements SW621-SW62M may also be other forms of logic gates or a combination of a plurality of logic gates, but is not limited thereto.

In the embodiment, power consumption may be effectively reduced through masking the clock signal CLK and prohibiting the clock signal CLK from being sent to the inside of the core circuits 611-61M which have stopped working, thereby improving the efficiency of power use.

Figure 7:
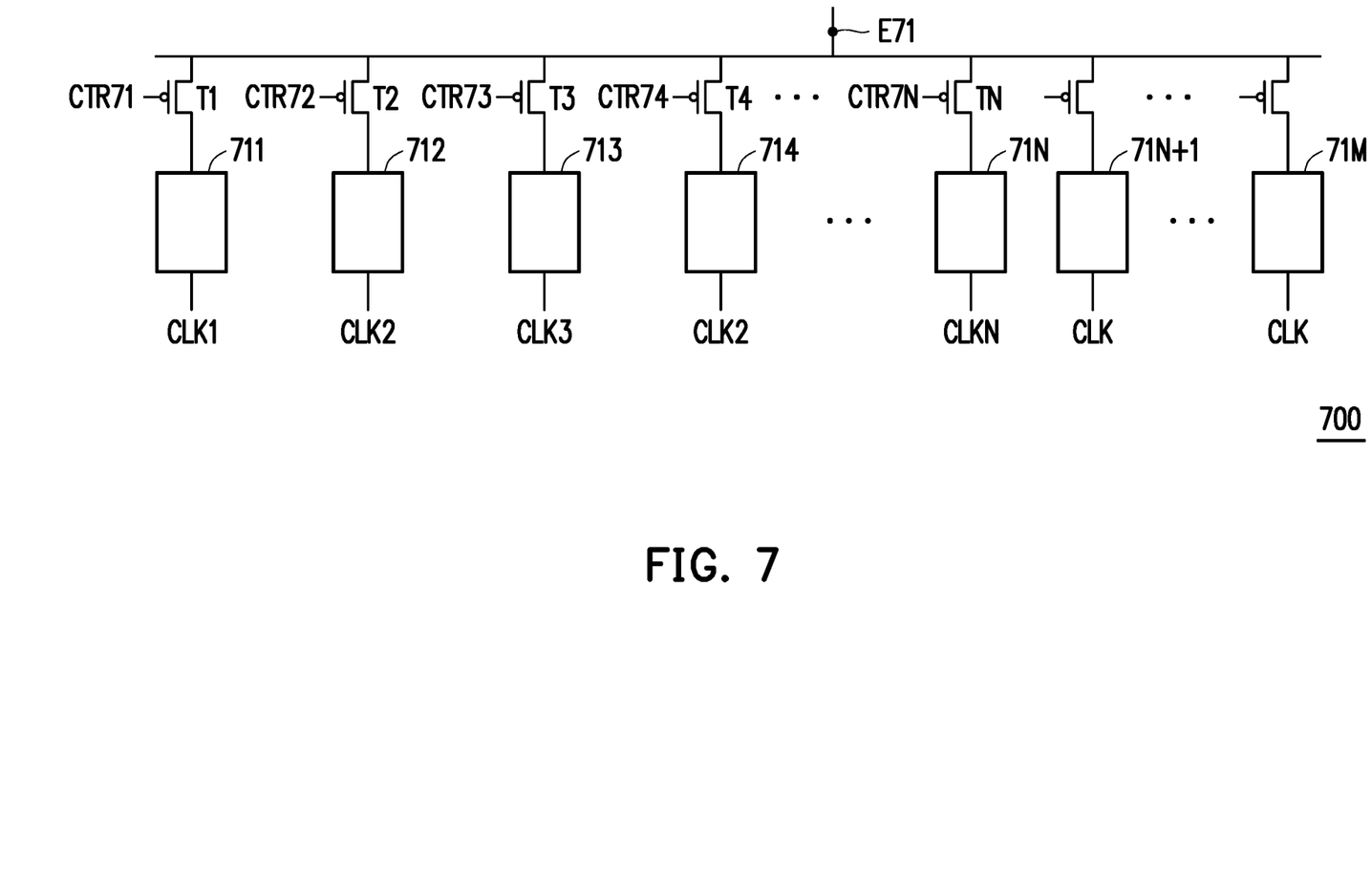
FIG. 7 is a schematic view of a chip in an integrated circuit apparatus according to another embodiment of the disclosure.

Please to FIG. 7. FIG. 7 is a schematic view of a chip in an integrated circuit apparatus according to another embodiment of the disclosure. In FIG. 7, a chip 700 includes a plurality of core circuits 711-71M and a plurality of transistors T1-TN. The transistors T1-TN are used to respectively form a plurality of power switches. The transistors T1-TN are coupled together to a first end E71 of the chip 700 and are respectively coupled to the core circuits 711-71M.

The control ends of the transistors T1-TN respectively receives control signals CTR71-CTR7N and are respectively turned on or off according to the control signals CTR71-CTR7N.

In the embodiment, the number of core circuits 711-71M is more than the number of power switches (transistors T1-TN). Some of the core circuits 711-71N need to be respectively coupled to a first end E71 of the chip 700 through the transistors T1-TN. The rest of the core circuits 71N+1-71M may be directly coupled to the first end E71 of the chip 700.

On the other hand, the core circuits 711-71N receive clock signals CLK1-CLKN controlled by the gating element (not illustrated). The core circuits 71N+1-71M receive a clock signal CLK which has not been controlled by the gating element.

In summary, the disclosure provides one or more bypass switches in a plurality of chips coupled in series. By turning on the corresponding bypass switch when a chip is damaged, the power supply voltage is prevented from being sent to the damaged chip, thereby effectively improving the efficiency of power use.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A semiconductor apparatus, comprising:
    a plurality of chips coupled in series with one another between a power end and a reference ground end; and
    a first bypass switch coupled in series between a first end and a second end of a first chip among the plurality of chips, wherein the first end of the first chip is coupled to the power end and the second end of the first chip is coupled to the reference ground end, wherein
    the first bypass switch is turned on according to a first control signal when an operational efficiency of the first chip is less than a threshold value and is determined to be damaged.

2. The semiconductor apparatus according to claim 1, wherein the first bypass switch is embedded in the first chip.

3. The semiconductor apparatus according to claim 1, wherein the first bypass switch is externally connected to an outside of the first chip.

4. The semiconductor apparatus according to claim 1, wherein when the first bypass switch is turned on, the corresponding first chip stops operating.

5. The semiconductor apparatus according to claim 1, further comprising:
    a controller, coupled to the first chip and the first bypass switch, for judging whether the operational efficiency of the first chip is less than the threshold value to determine whether the first chip is damaged and for generating the first control signal.

6. The semiconductor apparatus according to claim 5, wherein the controller sends a plurality of test commands to the first chip and receives a plurality of feedback information generated by the first chip, the controller determines whether the first chip is damaged according to whether a correct rate of the feedback information is more than the threshold value.

7. The semiconductor apparatus according to claim 1, further comprising:
    at least one second bypass switch coupled between a first end and a second end of at least one second chip among the plurality of chips, wherein the first end of the second chip is coupled to the power end and the second end of the second chip is coupled to the reference ground end, wherein
    the at least one second bypass switch is turned on according to a second control signal when the at least one second chip is determined to be damaged.

8. The semiconductor apparatus according to claim 7, wherein the at least one second bypass switch is embedded in the at least one second chip or is externally suspended from an outside of the at least one second chip.

9. The semiconductor apparatus according to claim 7, wherein the first chip comprises:
    m core circuits; and
    m power switches respectively coupled between a power end of the plurality of core circuits and the first end of the first chip, the plurality of power switches is respectively controlled to be turned on or off by a plurality of third control signals,
    where M is a positive integer.

10. The semiconductor apparatus according to claim 9, wherein when each of the core circuits is damaged, each of the corresponding power switches is turned off.

11. The semiconductor apparatus according to claim 9, wherein each of the power switches is a transistor switch.

12. The semiconductor apparatus according to claim 9, wherein the first chip further comprises:
    m gating elements respectively coupled between end points of the plurality of core circuits respectively receiving a plurality of clock signals, the plurality of gating elements is respectively controlled by the plurality of third control signals to decide whether to send the plurality of clock signals to the plurality of core circuits.

13. The semiconductor apparatus according to claim 7, wherein the first chip comprises:
    m core circuits; and
    n power switches respectively coupled between a power end of some of the plurality of core circuits and the first end of the first chip, the plurality of power switches is respectively controlled to be turned on or off by a plurality of third signals,
    where N and M are positive integers, and N is less than M.

* * * * *